United States Patent
Glielmo et al.

(10) Patent No.: US 7,658,334 B2
(45) Date of Patent: Feb. 9, 2010

(54) SYSTEM FOR THE REAL TIME INVENTORY AND LOCALIZATION OF REFRIGERATING CONTAINERS AND RELATED METHOD

(75) Inventors: Luigi Glielmo, Naples (IT); Davide Del Cogliano, Rome (IT); Corrado De Santis, Montemiletto (IT)

(73) Assignee: Smartfreeze S.r.l. (IT)

( * ) Notice: Subject to any disclaimer, the term of this patent is extended or adjusted under 35 U.S.C. 154(b) by 207 days.

(21) Appl. No.: 11/466,625

(22) Filed: Aug. 23, 2006

(65) Prior Publication Data

US 2007/0236357 A1 Oct. 11, 2007

Related U.S. Application Data

(60) Provisional application No. 60/744,309, filed on Apr. 5, 2006.

(51) Int. Cl.
*G05D 23/00* (2006.01)
(52) U.S. Cl. .............. 236/51; 455/404.2; 455/419; 455/421; 455/422.1; 455/433; 455/456.1; 455/556.1; 455/557; 709/223; 709/224; 709/225; 726/34; 726/35
(58) Field of Classification Search ............ 236/51; 340/572.1; 705/28; 709/223, 224, 225; 726/34, 726/35; 455/41.2, 404.2, 419, 421, 422.1, 455/433, 456.1, 456.3, 556.1, 557
See application file for complete search history.

(56) References Cited

U.S. PATENT DOCUMENTS 6,357,243 B1 * 3/2002 Efron et al. ................... 62/171

6,502,409 B1 * 1/2003 Gatling et al. ................. 62/80
2002/0029575 A1 * 3/2002 Okamoto ...................... 62/125

(Continued)

FOREIGN PATENT DOCUMENTS

EP     1 479 988 A2   11/2004
JP     2004 62315     2/2004
WO     WO 03/073201 A2  9/2003

(Continued)

*Primary Examiner*—Frantz F Jules
*Assistant Examiner*—Daniel C Comings
(74) *Attorney, Agent, or Firm*—Akerman Senterfitt

(57) ABSTRACT

System (10) for remotely controlling and monitoring a food refrigerator (1), and its content, of the type intended to be given in rental or in free loan from a manufacturer to a vendor of cold products, comprising a control unit (2) for checking and storing a plurality of functioning parameters of the food refrigerator (1), an RFID reader (3) intended to read data stored in a plurality of RFID tags attached to the cold products, a communication unit (4) for interconnecting an external device, the RFID reader (3) comprising means for retrieving data from said RFID tags when the cold products are still stocked inside the food refrigerator (1) and the communication unit (4) localization means for transmitting information to the external device about a geographical localization of the food refrigerator (1). System (10) according to claim 1 wherein said means produce a radio frequency signal at predetermined time intervals for activating said RFID tags. The data stored in said RFID tag comprises a unique identification number. The communication unit (4) is a GSM/GPRS unit. The external devices might be a second food refrigerator, residing in a same local area network (LAN). The external device is a remote server (5) located outside the local area network (LAN) equipped with a management information system.

18 Claims, 8 Drawing Sheets

U.S. PATENT DOCUMENTS

| | | |
|---|---|---|
| 2002/0089434 A1 | 7/2002 | Ghazarian |
| 2004/0100380 A1 * | 5/2004 | Lindsay et al. .............. 340/540 |
| 2005/0125312 A1 * | 6/2005 | Dearing et al. ................ 705/28 |
| 2006/0006999 A1 | 1/2006 | Walczyk et al. |
| 2006/0048194 A1 * | 3/2006 | Poslinski ..................... 725/81 |
| 2006/0200560 A1 * | 9/2006 | Waugh et al. ............... 709/224 |

FOREIGN PATENT DOCUMENTS

| | | |
|---|---|---|
| WO | WO 2005/015510 A1 * | 2/2005 |
| WO | WO 2005015510 A1 * | 2/2005 |

* cited by examiner

```
struct CellCode
{
    char lac[4];
    char cellId[4];
    char operatorCode[10];
};

struct Localization
{
    CellCode mainCell;
    CellCode cell1;
    CellCode cell2;
    CellCode cell3;
    CellCode cell4;
    CellCode cell5;
    CellCode cell6;
};
```

SYSTEM FOR THE REAL TIME INVENTORY AND LOCALIZATION OF REFRIGERATING CONTAINERS AND RELATED METHOD

CROSS-REFERENCE TO RELATED APPLICATIONS

This application claims the benefit of U.S. Provisional Patent Application No. 60/744,309, filed Apr. 5, 2006, the entire contents of which are incorporated by reference herein.

DESCRIPTION

1. Field of Application

The present invention relates to a system for controlling and monitoring a food refrigerator and its content of the type intended to be given in rental or in free loan from a manufacturer to a vendor of cold products, comprising a control unit for checking and storing a plurality of functioning parameters of said food refrigerator.

More particularly, the present invention relates to a system of the type described above comprising communication units for interconnecting external devices or to the internet, in order to allow a technician to check and modify, locally or remotely, the functioning parameters of the food refrigerator.

2. Prior Art

As it is well known, food refrigerators for ice creams and cold products in general may be located in public places, for example in coffeehouses, in order to maintain a predetermined temperature of the cold products before a sale.

More particularly, the food refrigerator may be equipped with a control unit for checking a plurality of functioning parameters, for example a temperature value inside the food refrigerator, its power on/power off status or the quantity of cold products already available.

The control unit may alert a user, for example when the food refrigerator is quite empty or when the temperature is too high, in order to prevent a waste of the products. In case of abnormal functioning, the control unit may for example emit an acoustic signal or switch on a light.

More particularly, some food refrigerators are provided with a control unit implementing an RFID system to detect the number and type of products. The RFID system includes a reader with an antenna and a plurality of tags provided with a coupler antenna. Each tag is attached to a corresponding cold product, for example it is attached to a case hosting or enveloping such product.

More in detail, a tag is usually a passive component because it is not equipped with a battery in order to be powered but it is activated by an electromagnetic field; some special tags are active components because they include a self power-on. In both cases, the reader sends, through its antenna, a radio frequency signal that is captured by the coupler antenna embedded inside the tag so that a response signal, storing information associated to the cold product whereto the tag is attached, may be returned from the coupler antenna to the reader.

More particularly, electric circuitry inside passive tags are powered by the electromagnetic field generated by the reader, during the transmission of the radio frequency signal. Passive tags are used for their lower cost, especially for application when the tag cannot be reused after the selling of the product to which it is attached.

Generally, the minimum informative content stored inside passive tags is an alphanumeric code one by one associated to the cold product, more particularly, to the case wherein the food is stored. In this way two different tags never store a same alphanumeric code so that the tag not only identifies a certain product category but also the single specimen of the product.

Another important issue for such food refrigerator is that they are sometimes given in rental or in free loan, from a manufacturer of cold products to a vendor of such cold products, for example to a coffeehouse. In this way the vendor is much prone to buy cold products, since he/she is not involved in buying or maintaining the food refrigerator.

Of course the manufacturer of cold products is interested in the correct functioning of his food refrigerator, especially to be sure that it is correctly working, it is not empty and to be aware that the food refrigerator is used by the specific vendor to which it was originally delivered. In other words, the manufacturer of cold products must be conscious about every action taken on his food refrigerator.

A prior art document, the United States patent No. US 2006/0006999 A1, discloses a system and a method for monitoring the temperature inside refrigerators, more particularly in hospital field. A specific RFID tag able to read temperatures, sends a value of temperature to an RFID reader. The system provides the storing and the managing of information inside an electronic log in order to check the temperature depending on time and, in the case of abnormal functioning, to send a message to a maintainer of the food refrigerator.

The system and the method of this prior art solution are specifically indicated for asset tracking and inventory maintenance, especially for hospitals, but no reference is made to the monitoring of the refrigerator location outside the hospital area wherein the refrigerator is usually hosted, for example a remote monitoring driven by a manufacturer of the refrigerator not residing inside the same hospital area. In other word, the system and the method do not provide the localization of the refrigerator, since it is supposed that the refrigerator always resides in a delimited local area. Moreover, the RFID tag is responsible to take a measure of the temperature, not to track a product inventory inside the food refrigerator.

A second prior art document, the United States application No US 2002/0089434A1 relates to a tracking system comprising a GSM/GPS application but it is substantially based on a "gate access control" system for tracking people or vehicles. In this case, no reference is made to the localization of refrigerators nor to the inventory of products.

A third solution is disclosed by the European patent application No EP1479988, relating to wireless electronic control system for home appliances, more particularly for refrigerators, based on wireless transponder sensors for checking parameters of a device and with RFID tag attached to the products.

The system discloses a monitoring and a local control of parameters in order to check a correct functioning of the refrigerator and it supports the control of products inside it. A reading of functioning parameters is executed through a device external to the refrigerator, for improving the intervention of a technician. Anyway no reference is made to the remote control of such parameters, nor a localization of the food refrigerator through a remote control unit, in order to check remotely whether it is turned on and/or located near the vendor where it was delivered.

Another prior art document, a patent application with international publication number WO03073201, discloses the control of products with RFID tag inside micro-warehouses, included in a refrigerator. An identification of products depends on their passages through a refrigerator door, entering and exiting the refrigerator, while no reference is made to the identification of products inside the refrigerator itself. In this specific application, the remote control of functioning parameter of the food refrigerator is not considered, nor the remote control of products stored in it.

Finally, the Japan application No JP2004062315 relates to a system and a method for monitoring devices for managing home appliances during their life cycle. A tag is a central instruments for monitoring the home appliance in this application, but it is not an instruments for remote control, nor for checking the number of products available inside the home appliance.

The problem at the basis of the present invention is that of providing a system for checking the geographic localization of food refrigerators, for example given in rental or in free loan from a cold products manufacturer to a cold products vendor, the system supporting an embedded control unit for checking functioning parameters of the food refrigerator as well as for inventorying the products stored inside, so that the manufacturer is aware of well-function or malfunction of the refrigerator and of all actions taken on his food refrigerator and so that he is also remotely aware of the content of the food refrigerator, without requiring a local action such as a movement of cold products inside the refrigerator, allowing an optimisation of the profit of the rental or free loan of the food refrigerator.

SUMMARY OF THE INVENTION

One embodiment of the present invention relates to a system for inventorying the content of a food refrigerator through an RFID system detecting tags attached or associated to cold products, independently by their movement, the system comprising a check of the geographic localization of the food refrigerator through GSM/GPRS means, hereinafter indicated as delocalization check.

A further embodiment of the invention relates to a system for remote control of a food refrigerator of the type intended to be given in rental or in free loan from a manufacturer to a vendor of cold products, comprising:

a control unit for checking and storing a plurality of functioning parameters of said food refrigerator, an RFID reader intended to read data, stored in a plurality of RFID tags attached to said cold products, a communication unit for interconnecting an external device, said RFID reader comprising means for retrieving said data from said RFID tag when said cold products are still stocked inside said food refrigerator and said communication unit comprising localization means for transmitting information to said external device on a geographical localization of said food refrigerator.

The characteristics and the advantages of the system according to the present invention will be apparent from the following description of an embodiment thereof, made with reference to the annexed drawings, given for indicative and non-limiting purpose.

DETAILED DESCRIPTION

Figure 1:
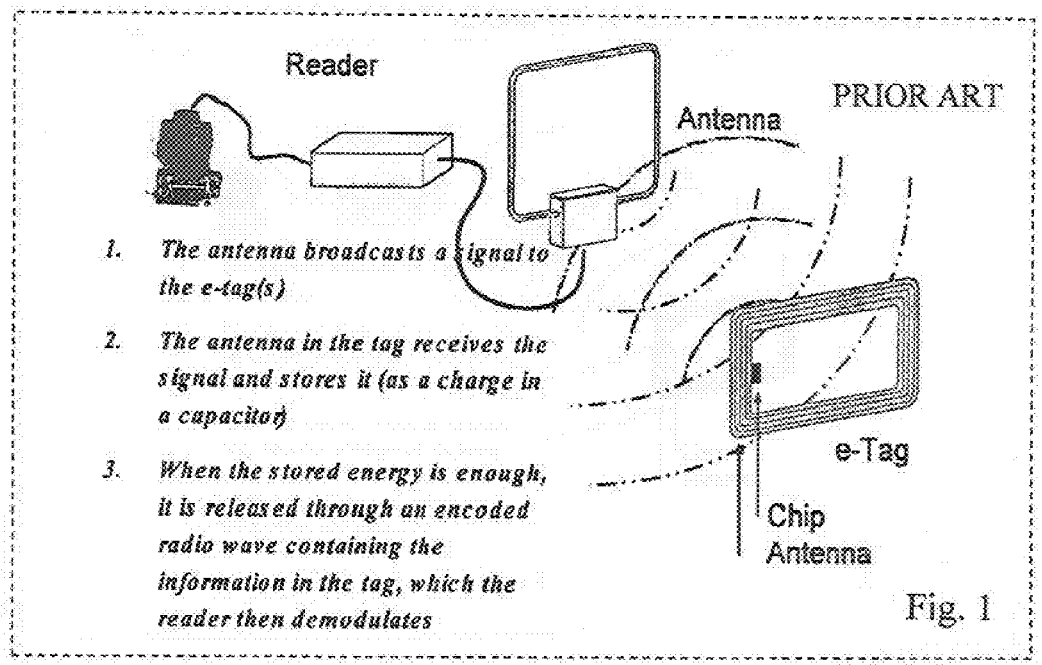
FIG. 1: schematically shows, in a diagram block, an RFID system according to the prior art.
Figure 2:
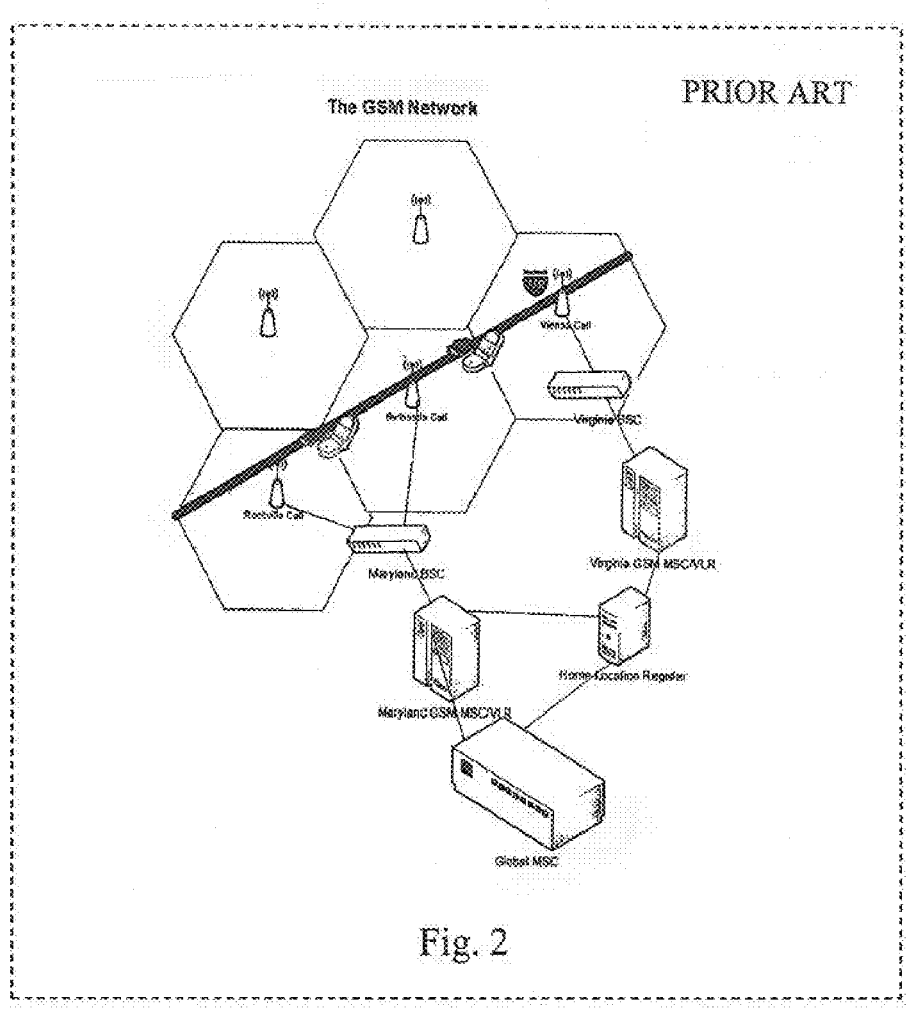
FIG. 2: schematically shows some transmission cells of a GSM network, an information on the transmission cell whereto a mobile device is connected being retrievable via software, according to the prior art.
Figure 3:
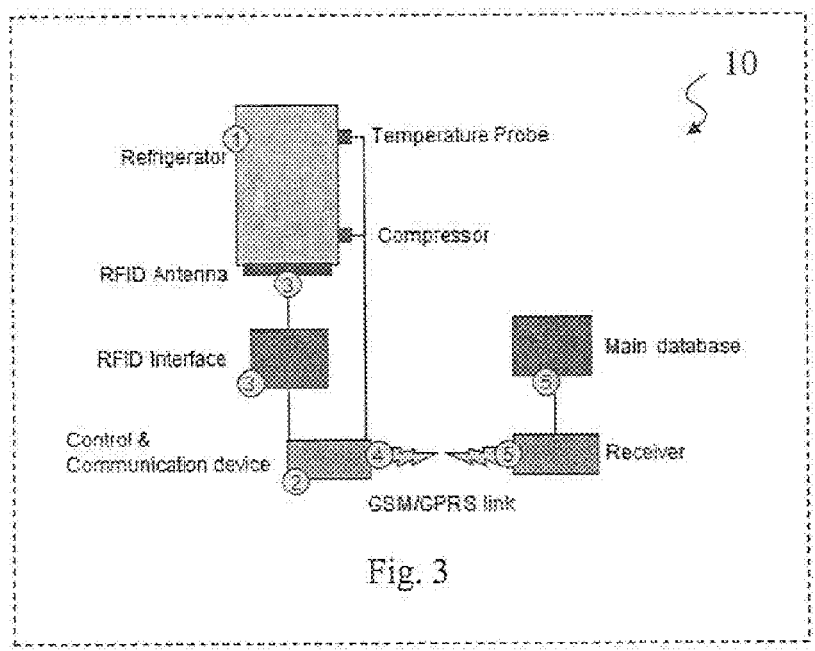
FIG. 3: schematically shows a block diagram of the system according to the present invention.
Figure 4:
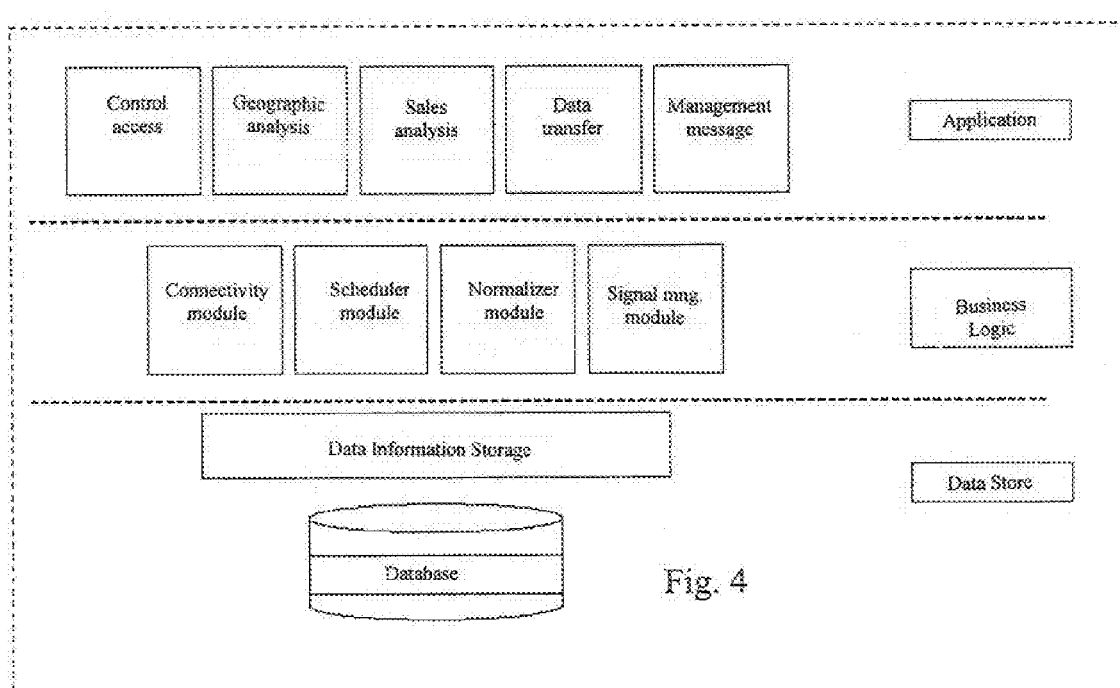
FIG. 4: schematically shows a block diagram of the management information system according to the present invention.

According to the present invention and with reference to the annexed drawings, a system for remotely controlling food refrigerators or refrigerated vending machines is schematically represented with the numeral reference 10.

The food refrigerator 1 is of the type intended to be given in rental or in free loan from a manufacturer of cold product to a vendor of such cold product, for example to a coffeehouse, not limiting the scope of the present invention. In fact, the food refrigerator 1 is also referred to "frigobars" for rooms of hotel chains wherein it is important to know its precise content, in order to prepare a corresponding billing for a client or to supply an opportune refurbishment after consumption.

More particularly, the system 10 comprises a control unit 2 for checking a plurality of functioning parameters of the food refrigerator 1, for example indicating a temperature value inside the food refrigerator 1, its power-on/power-off status or the quantity of cold products still available.

Such functioning parameters are monitored by the control unit 2 in order to detect an abnormal functioning of the food refrigerator 1 and to prevent a waste of the cold products.

The system 10 also comprises an RFID reader 3 intended to read a plurality of tags attached to a corresponding plurality of cold products to be tracked. The RFID reader 3 may for example be enclosed in an apposite protective case of the food refrigerator 1.

The system 10 also provides a communication unit 4 for interconnecting the food refrigerator and one or more external devices. For example, the communication unit 4 is a GSM/GPRS unit or a wireless unit intended to communicate with a second food refrigerator, provided with same GSM/GPRS unit or provided with a wireless unit 4, and located in a LAN with the food refrigerator 1.

The communication unit 4 is intended to connect via GSM/GPRS or via wireless communication a remote server 5, for example remotely located outside the LAN wherein the food refrigerator 1 is positioned.

More particularly, the remote server 5 can be reached, for example through the internet network, by the management of the manufacturer of food products while the food refrigerator 1, including the communication unit 4, is located at the vendor of food products, the vendor and the manufacturer potentially being in different countries.

The system 10 according to the invention comprises a food refrigerator monitoring and inventory hereinafter described: the cold products are arranged in a plurality of cases, for example, in mono-use boxes whereon a tag is attached in non removable way, in order to advantageously provide a one by one association between a cold product and the corresponding case.

The term "case" according to the present invention may also be referred to a plastic wrap used to wrap around the cold product or a solid box wherein such product is placed.

According to the present invention, the RFID reader 3 detects a quantity of cold products inside the food refrigerator independently of a movement of such products. The RFID reader 3 sends an electromagnetic signal at predetermined time intervals, for example every second or more frequently, in order to hear a response by the tags corresponding to cold products. This periodical scan can occur continuously or rather under certain conditions (so as to reduce the amount of data to be processed and the power consumption), e.g. when the doors of the refrigerators are opened.

The electromagnetic field generated by the RFID reader 3 powers on the tags at predetermined time intervals. Advantageously, the presence of a cold product can be detected independently of a movement of such products through a door of the food refrigerator 1 and, more generally, without the intervention of a human-driven movement or an electromechanical movement of the tagged products.

In other words, the RFID reader 3 scans the interior of the refrigerator enabling a real time inventory thus making an instantaneous "picture" of the content of the food refrigerator 1 and, on the base of an answer received by the e-tagged products, can provide a complete inventory of the products inside the food refrigerator as well as a count of the incoming and outcoming flows of products. The incoming and outcoming flows of products can be easily determined by the control unit 2 examining the sequence of said "pictures".

The inventory includes a plurality of inventory data, for example comprising the number of sold products during a period of time, their permanence inside the food refrigerator and their relevant dates, that might be a possible deadline or a delivering or sale date.

The system according to the present invention does not determine the quantity of products during their passage through the food refrigerator door, so that it is not possible to lose information for example because more than one cold products are inserted or extracted at a same time through the food refrigerator door, the reading of a first tag associated to a first product being impeded by the presence of a second tag attached to a second cold product.

The control unit 2, at predetermined time intervals, for example once a day, takes the inventory data detected by the RFID reader 3 and transmits them to the remote server 5 via the communication unit 4. The control unit 2 sends to the remote server 5 also a plurality of function parameters indicating a state of the food refrigerator, for example samples of refrigerator or environment temperature and moisture during a day, the number of openings of the food refrigerator door, the number of switchings on and off or the number of hours of activity of a compressor unit inside the food refrigerator or other subsystems, the power consumption.

The system 10 also comprises a localization/delocalization of the food refrigerator 1, providing the control unit 2 with the transmission to the remote server 5 of additional information, extracted from the communication unit 4, for example from the GSM/GPRS modem, which allow to remotely check that the food refrigerator, delivered to a specific vendor, is not moved and re-located to a non authorized location (delocalization check).

More particularly, a GSM/GPRS communication system is based on a partition of geographical areas into a plurality of transmission cells. When a GSM/GPRS communication between the remote server 5 (actually its front-end) and the food refrigerator 1 is required, the communication unit 4 executes a connection with a transmission cell dedicated to the area wherein the food refrigerator 1 resides.

Figures 13, 14:
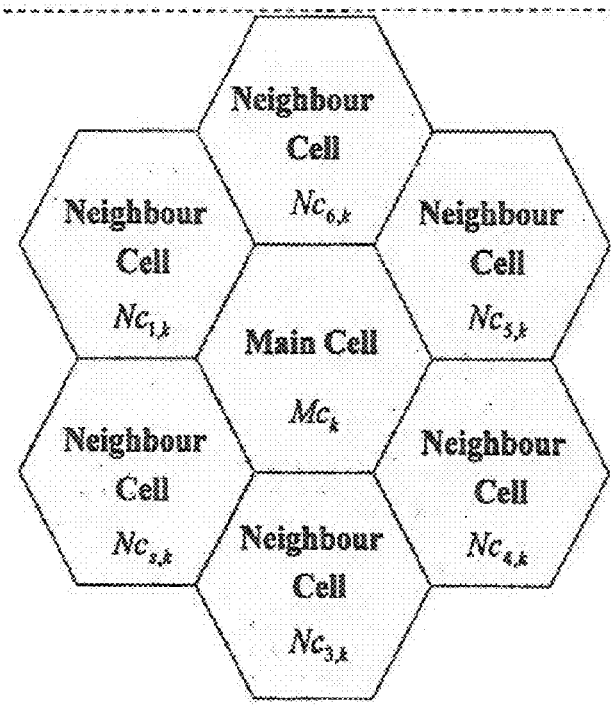
FIG. 13: schematically represents, in a pseudo code, the data structure to be used for the delocalization check, according to the present invention.
FIG. 14: schematically shows, at any given time, a possible network configuration for a delocalization check, according to the present invention.

The system 10 includes a software for retrieving, from the GSM/GPRS modem, the main cell and the neighboring cells around the refrigerator (see FIG. 14). This cell information, indicative of a relatively large area and not of a specific location, for instance at address level, can be used to detect whether the refrigerator has been moved from its supposed location.

More in detail if, after a power-off period, the communication unit 4 detects a transmission cell never referred to in previous communications, the control unit 2 can trigger a transmission of a delocalization message to the remote server 5, alerting that a theft or an undesired movement of the food refrigerator 1 may have occurred.

More than one alternative measure can be implemented to prevent false alarms or undetected alert conditions, considering too that the set of cells around a location can be dynamically changed by a provider according to its network configuration. For example, a set of secure transmission cells for a specific location of the food refrigerator 1 can be defined in order to prevent the sending of such delocalization message when the communication unit 4 contacts any transmission cell of said set.

However, the system 10 can also be used to obtain more precise localization information by interrogating, through specific software and with additional communication costs, the GSM/GPRS company, provided it offers such service as it is now more and more common.

Moreover, the localization/delocalization according to the system 10 may retrieve information from other communication systems, for example from a CDMA (code division multiple access) cellular system, or the Global Positioning System (GPS) or the OmniTRACS satellite system generally used for transportation logistics.

The system 10 supports communications between the remote server 5 and the communication unit(s) 4 in synchronous or asynchronous and bi-directional way: the remote server 5, receiving functioning parameter and inventory data, can directly intervene on the control unit 2, for example remotely modifying the temperature settings of the food refrigerator 1 (of one particular refrigerator, or some refrigerators, e.g. in a certain geographical area). The intervention can be fully automatic or rather mediated by an operator through a decision support system.

With a capillary report of information periodically sent by the on-board control units, the remote server 5 knows the content of each food refrigerators 1, their locations, the delivery flow of cold products, their vending flows, the total amount of cold products delivered, the number of cold products delivered and already sold, the number of food refrigerators powered on or their status. In this way the manufacturer of cold products can schedule the production and the delivery of cold products and the maintenance of food refrigerators 1, optimizing all activities.

A transmission of inventory data or functioning parameters to the remote server 5 can also be directly triggered by a fault, detected by the control unit 2. For example, an incorrect value of temperature, the absence of cold products or a breakdown of the compressor can be detected and trigger an immediate transmission of inventory data or functioning parameter to the remote server 5. In this way, a corresponding action can be immediately taken from the cold product manufacturer or the maintenance team. The on-board unit is equipped with a back-up battery so that storage of data and their transmission is possible also during a power-off situation, so that the remote server 5 can be informed also on the power-off status.

Figure 5:
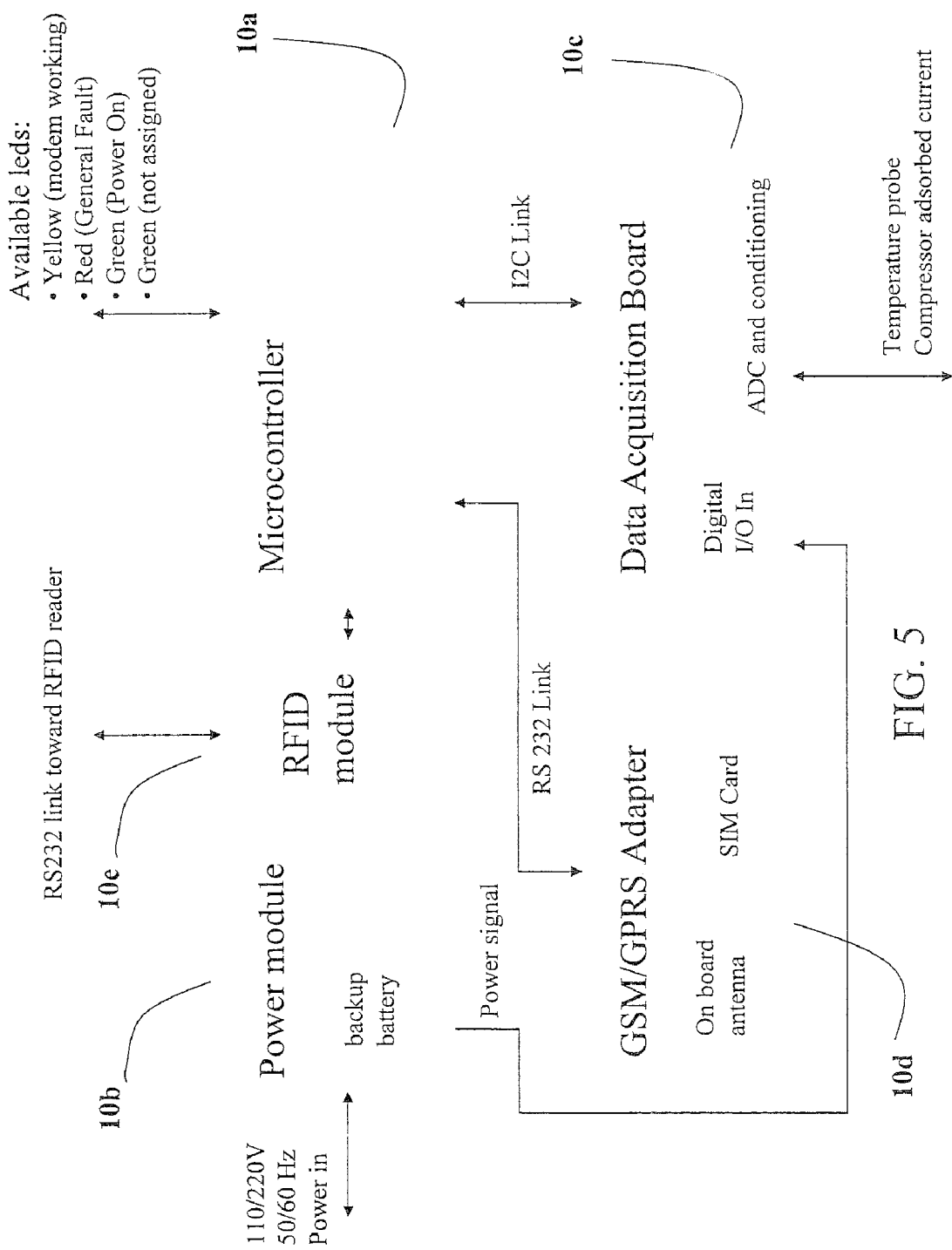
FIG. 5: schematically shows an example of hardware modules architecture according to the present invention.

With reference to FIG. 5, hardware modules included in the system 10, subsystems 2 and 4, are schematically represented: a microcontroller 10a, a power module 10b, an input/output electronic unit 10c, a GSM/GPRS modem 10d and an RFID module 10e.

More particularly, the communication unit 4 comprises a quadri-band wireless GPRS modem, operating at 850, 900, 1800, 1900 Mhz frequencies. A communication between the communication unit 4 and the remote server 5 can be based on a HTTP Protocol and a PPP/IP network stack.

Figure 6:
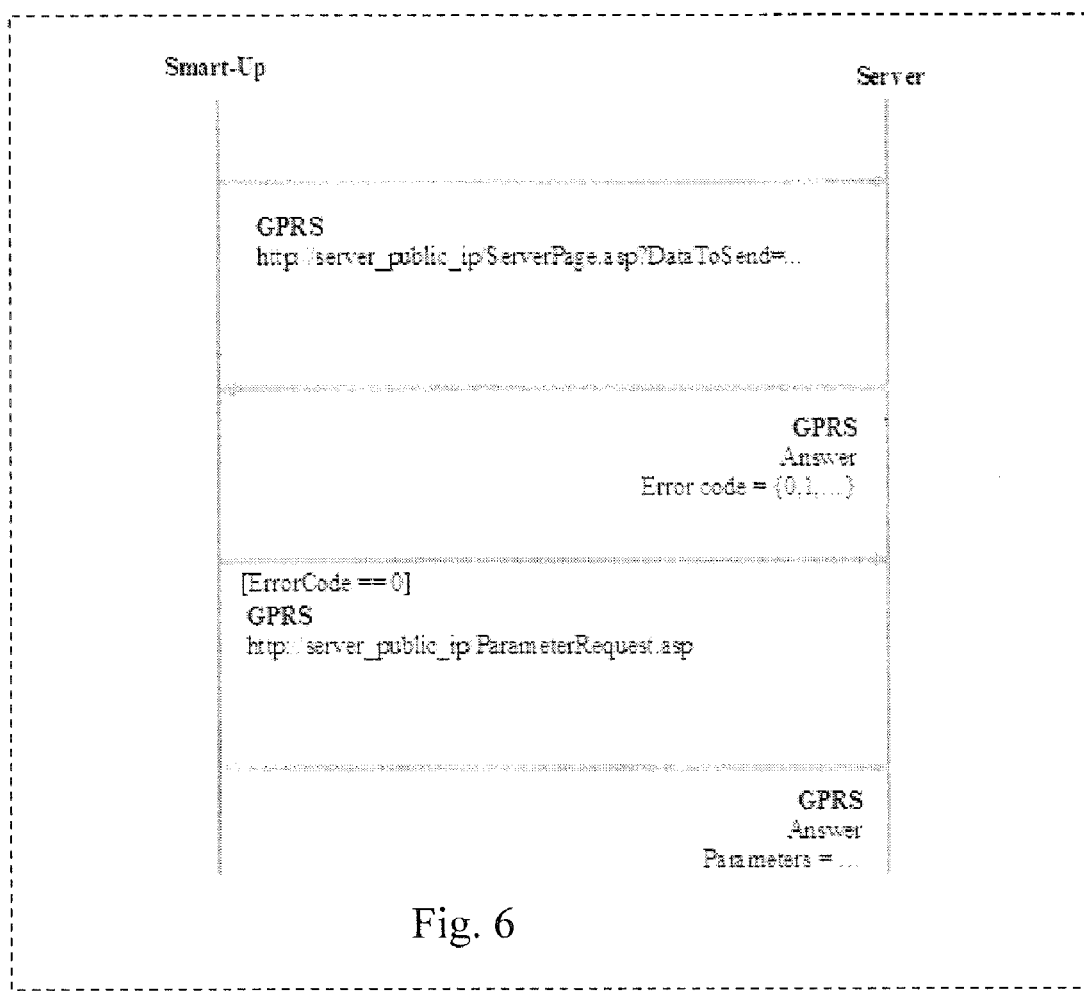
FIG. 6: schematically shows an example of a GPRS communication between a remote server and a refrigerator control unit, initiated by the control unit, according to the present invention.
Figure 7:
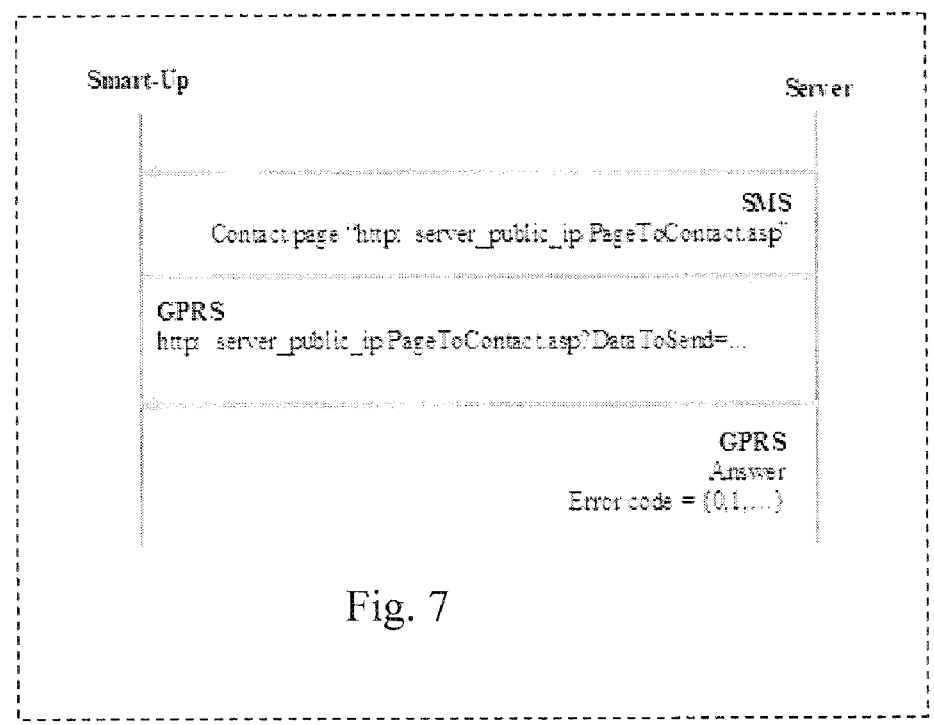
FIG. 7: schematically shows an example of a GPRS communication between a remote server and a refrigerator control unit, initiated by the remote server, according to the present invention.

The communication via GPRS can be initiated by the on-board unit as schematically represented in FIG. 6 or by the remote server 5, as schematically represented in FIG. 7.

The communication unit 4 provides network local adapters (for example a LAN Ethernet adapter or a local wireless adapter, Wi-Fi or BlueTooth) in order to connect a local area network to a remote network.

Such adapters are used to share, among more than one communication unit 4 associated to corresponding food refrigerators 1, a single remote communication toward a remote network or a remote server 5, reducing costs and optimising communication link.

Figure 8:
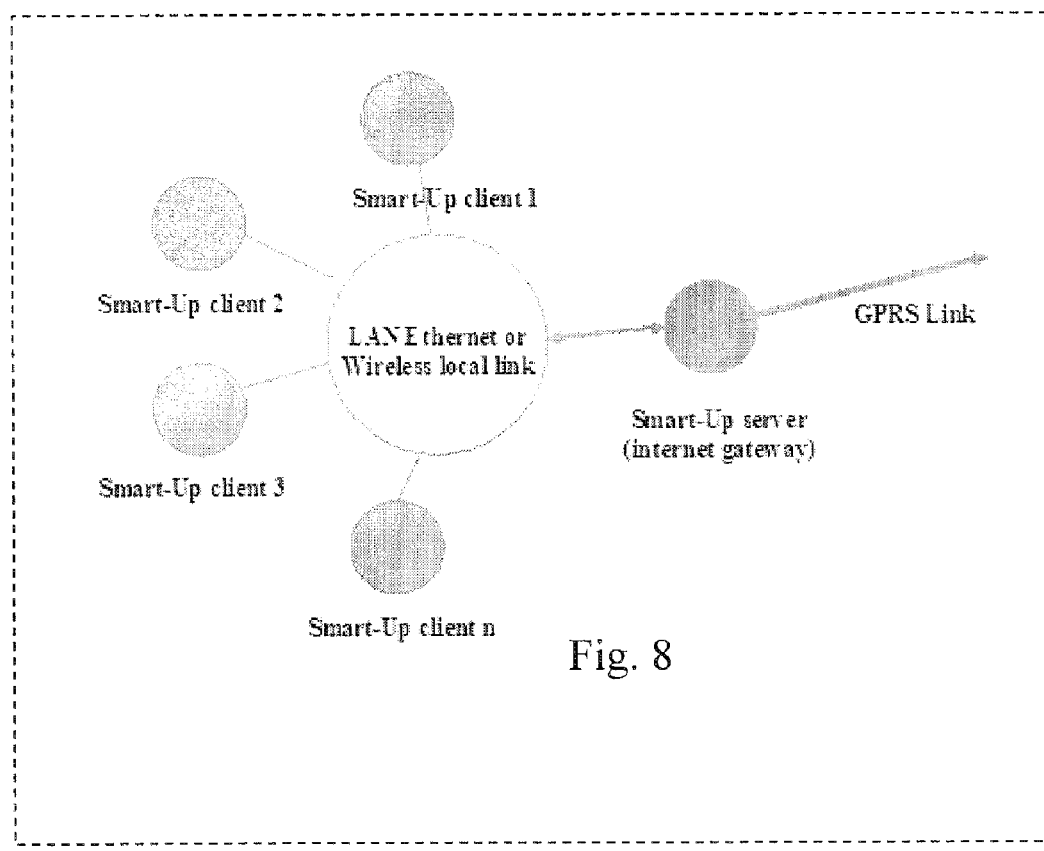
FIG. 8: schematically shows a Local Area Network or a wireless network interconnecting food refrigerators, interconnected through a gateway to an external network, according to the present invention.

FIG. 8 schematically shows a system 10 wherein a plurality of food refrigerators 1 are interconnected in a local area network through respective network adapters and interfaced to a remote network or to a remote server 5, for example through an internet gateway implementing a GPRS connection.

Each food refrigerator 1 comprises a client accessible only inside the local area network, for example implementing a software for responding to requests based on the HTTP protocol.

More particularly, one of said client is also set as a network server towards a remote network, for example to the internet so that one or more clients can redirect HTTP request to such network server.

The network server, acting as a conventional internet gateway, forwards the data from the clients to the remote server 5. Any communication coming from a remote network or from a remote server 5 is received by the network server and dispatched to the corresponding client inside the local area network.

Figure 9:
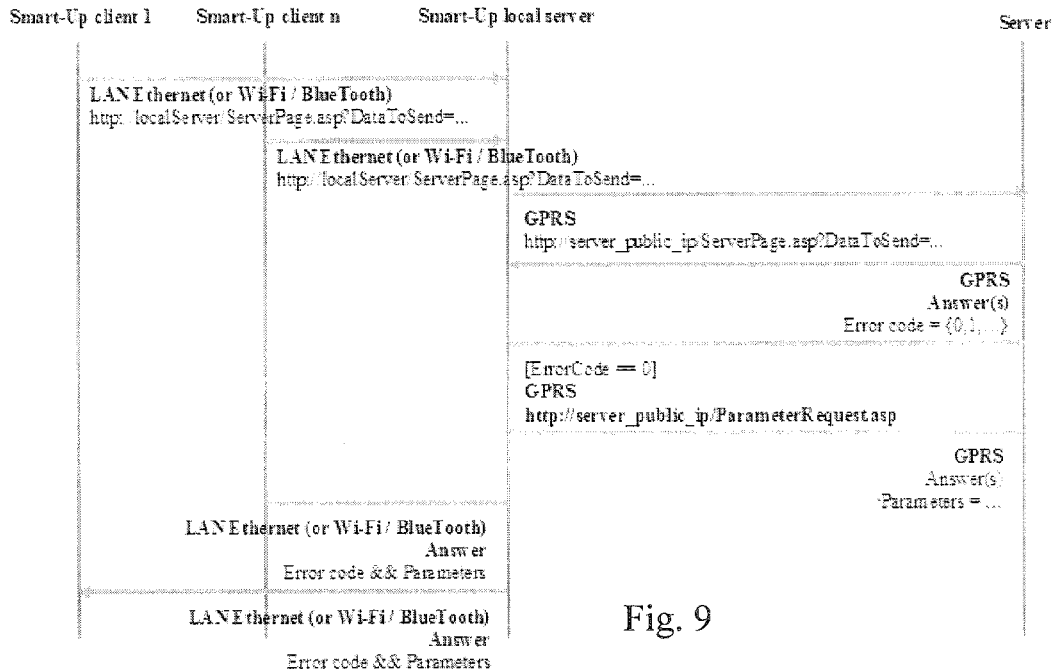
FIG. 9: schematically shows an example of a communication initiated by a Local Area Network or the wireless network of FIG. 8 toward a remote server, according to the present invention.
Figure 10:
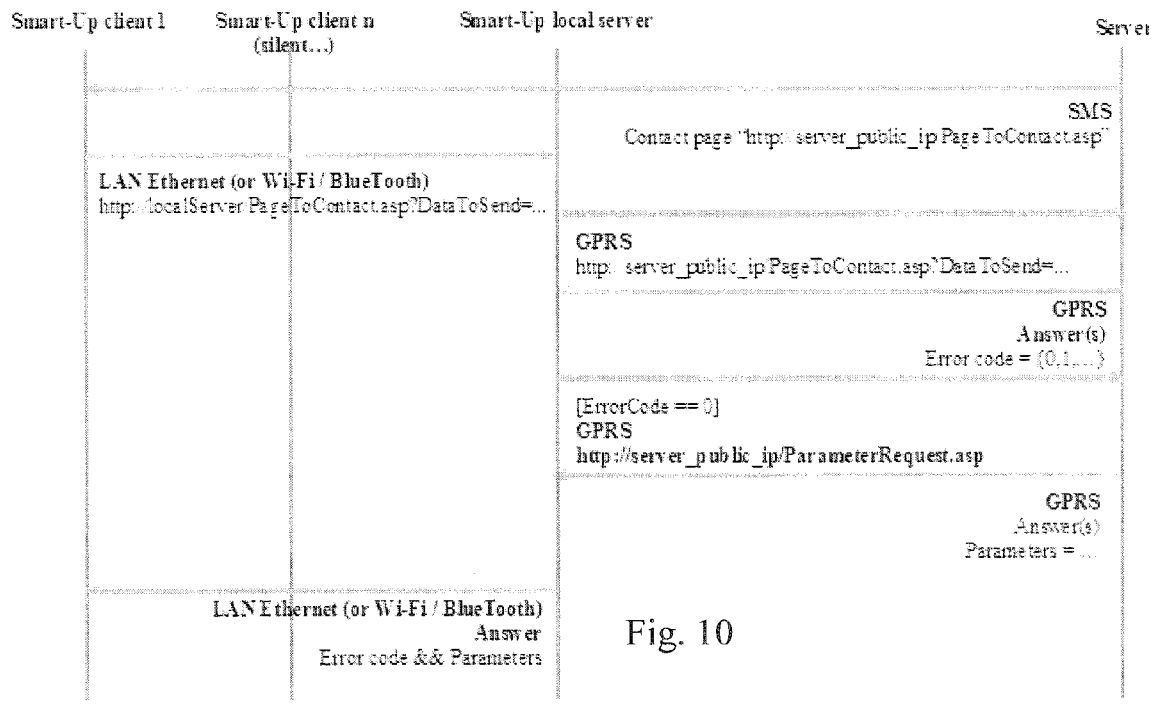
FIG. 10: schematically shows a possible communication between a remote server and a Local Area Network of refrigerators, according to the present invention.

In FIG. 9 a protocol for initiating a communication from a client in the local area network to a remote server 5 is schematically represented.

Figure 11:
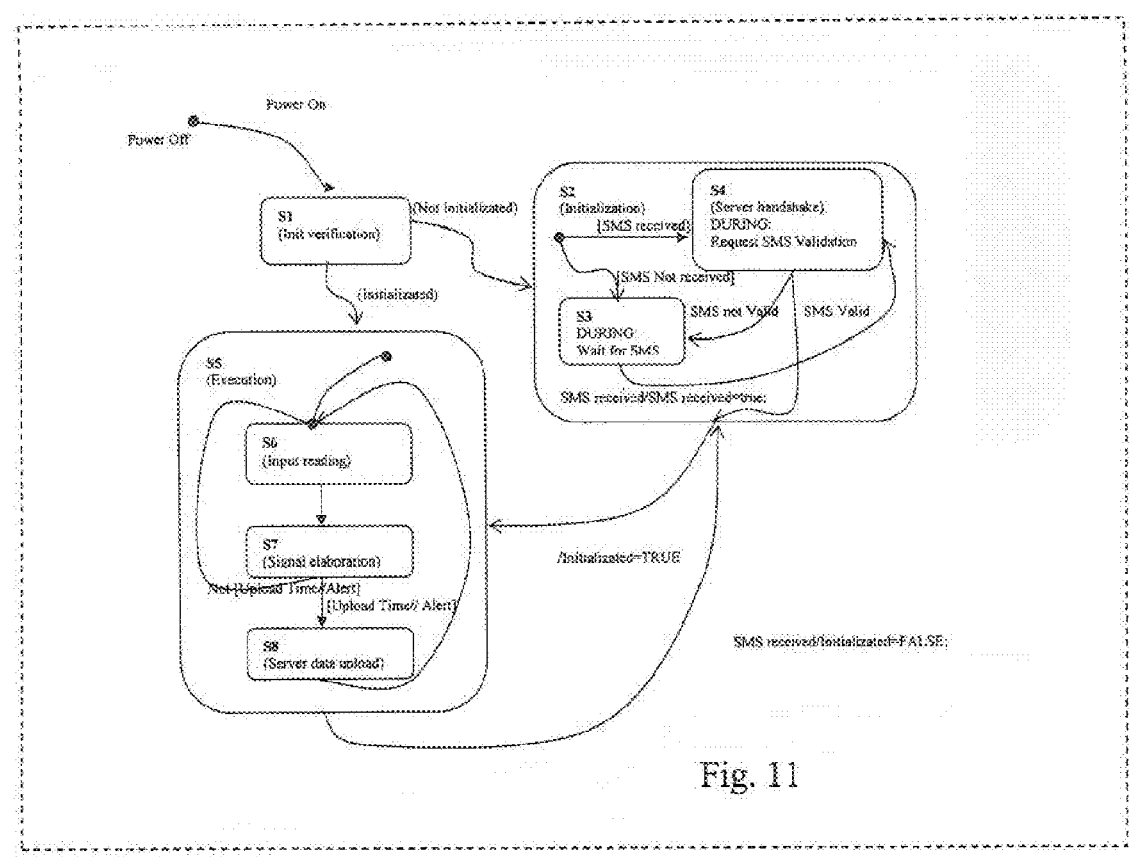
FIG. 11: schematically shows in a state diagram, the possible states of the control unit working on board of a refrigerator, the super-states being S1 (Initial verification), S2 (Initialization), S3 (Execution), according to the present invention.
Figure 12:
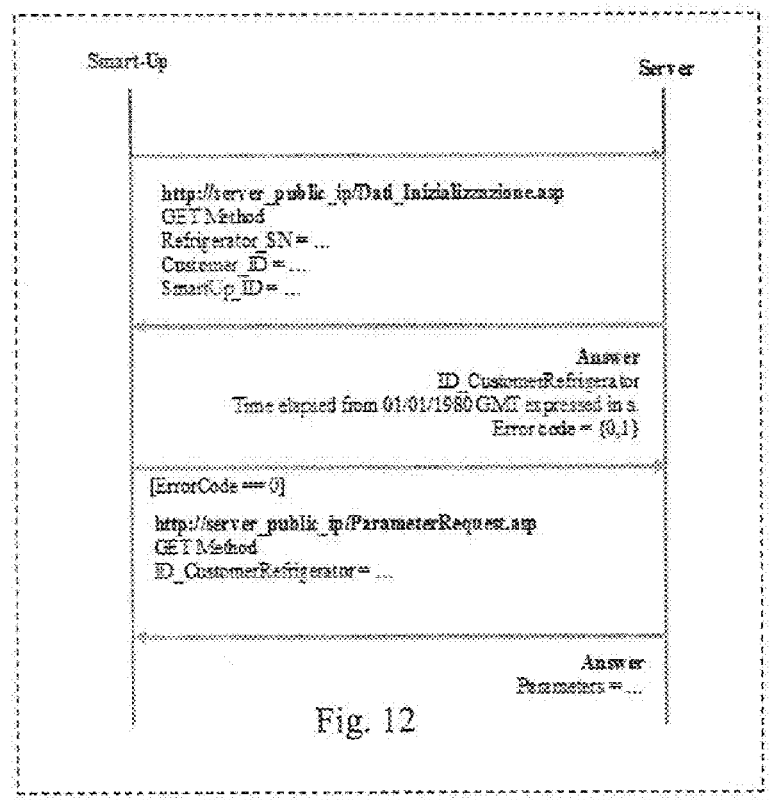
FIG. 12: schematically shows an example of communication between a refrigerator control unit and a remote server to initialize the control unit and assign it to the specific refrigerator.

According to the present invention, the control unit on board the refrigerator 10 is programmed on the base of a State Diagram, as schematically represented in FIG. 11. An initialisation procedure, corresponding to the state S2, is executed to set up the system 10.

More particularly, during the permanence in state S2 an alarm led is lighted on control unit 2 so that an operator can understand that the control unit is not yet working. The led is switched off during the permanence in state S5.

State S1 is executed only once after power on. In such state a variable is checked in a serial flash storage memory, for example included in the control unit 2, in order to decide the following state accordingly.

During initialization, the communication unit 4 waits for an SMS sent by an installer, storing information about a serial number of the food refrigerator and a customer code to which it is associated; this information is validated by the remote server 5 with a GPRS handshake.

More particularly, if the SMS is validated by the remote server 5, the communication unit 4 asks to the remote server 5 a plurality of functioning parameters. During the validation handshake the communication unit 4 send the IMEI code of an installed modem.

State S5 corresponds to an execution of normal operations driven by the communication unit 4 and the control unit 2. A plurality of sub-states of state S5 are possible, in order to modularise operations during execution. We analyze the example of FIG. 11.

State S6 corresponds to Input signal reading, as reported in the table below. For each sample of a signal, a couple "sample value, sample time" is recorded. Following is a possible list of sampled variables and sampling parameters.

| Name | Type | Sampling time | Historical memory on the control unit |
| --- | --- | --- | --- |
| Temperature | Analogic | 1 min | 3 days |
| Adsorbed compressor current | Analogic | 1.5 s | 3 hours |
| Compressor activation | Digital | Event based | 3 days |
| Localization | Structured | 30 min | 3 days |

More particularly, the localization signal comprises a structured information of the type represented in the pseudo code of FIG. 13.

In order to retrieve a localization signal, a loop on the communication unit 4 is executed, for example asking the identification of the main cell and the neighboring cells and the operator code. More particularly, the information on localization, or better the delocalization check, is obtained by verifying, after a power fault, that either the cells utilized by the GSM/GPRS communication systems are the same used before the fault or the number of new cells is not greater than a specified threshold.

Finally State S7, corresponding to signals elaboration, is divided into the following steps:
  storing data into a non volatile on board memory, for example in serial flash memory included in the control unit 2;
  food refrigerator fault detection;
  delocalization detection.

A possible delocalization check algorithm is schematically described hereinafter without limiting the scope of the invention. More particularly, at any given time, the possible network configuration, detected through the GSM/GPRS modem, is reported in FIG. 14 and given by the set:

$N_k = \{Mc_k, Nc_{k,j}\}$, which includes a main cell $Mc_k$ and a number of up to 6 neighboring cells $Nc_{k,j}$, where k is the sample time and $j = 1 \ldots Nc_{max}$, $Nc_{max} = 1 \ldots 6$ (the number of neighboring cells), according to the network configuration.

Hence the cardinality of the set $N_k$ is $1 \leq |N_k| \leq 7$ (in other words, up to 7 cells are detected by the modem at each time).

A delocalization of the communication unit 4 is detected after a power-off and the successive power-on by checking whether the cells utilized by the GSM/GPRS systems have changed with respect to the situation before the power-off. In particular, denoting by k the time after the power fault and with k−1 the time before the power fault, if the cells at time k are exactly the same as at time k−1, or if number of overlapping cells before and after the fault is greater than a prescribed threshold TH (depending on the number of cells connected at time k−1) a delocalization is not flagged; otherwise a delocalization warning is produced. The algorithm can be described as follows:

$$UnitDelocalized = \begin{cases} \uparrow PowerOn, \\ |I_k| \leq TH(|N_{k-1}|), \end{cases}$$

where $I_k$ is the set of overlapping cells, i.e. cells which were connected at time k−1 before the power-off and are again connected at time k after the power-on, i.e.

$$I_k = N_k \cap N_{k-1}$$

and the following table gives possible thresholds corresponding to the number of cells connected before the power-off:

| $|N_{k-1}|$ | $TH(|N_{k-1}|)$ |
|---|---|
| 7 | 3 |
| 6 | 3 |
| 5 | 3 |
| 4 | 2 |
| 3 | 2 |
| 2 | 1 |
| 1 | 0 |

Thus if, for example, 5 cells were detected at time k−1, a warning is issued if only 3 of them (or less) are detected again after the power-on.

Of course other and further checks can be realized on the remote server 5 (rather than on the local on-board control unit 2) on the base of a much wider collection of historical data and more powerful computational capabilities so as to avoid false alarms.

The system 10 also provides a management information, on the remote server 5, comprising one or more memory devices for storing informative data, divided in a plurality of logical modules hereinafter described:

Application or user level, comprising:

control access: a module responsible for the authentication of a users, for example the authentication of a user accessing the remote control unit 5. This module is also used to profile a user, associating a corresponding access level;

geographic analysis: a module responsible for the presentation of inventory data, depending on the localization parameters, time parameters, type of product;

sales analysis: a module responsible for the presentation of data about sales, depending on localization parameters, time parameters, type of product;

data transfer: a module responsible for data transfer towards data mining systems;

management message: a module responsible for the management of massage sending, for example alerts, interrupts, SMSs, e-mails.

Business logic, comprising:

connection: a set of components responsible for the connection of the remote server 5 with an on-board unit to be controlled, comprising the implementation of a specific communication protocol;

scheduler: a set of components responsible for the management of the activation of communication channels;

normalizer: a set of components responsible for a normalization of data depending on functioning parameters coming from different connections. Normalized data can be processed from the informative data unit, for example in order to create reports;

signal management: a set of components responsible for the managing of information of signal used by modules for presentation of messages.

Data store, comprising:

data information storage: a set of components responsible for a driven writing of information inside the informative data unit.

database: the core of the informative data unit.

The present invention also relates to a method for remote control of a food refrigerator 1 of the type intended to be given in rental or in free loan from a manufacturer to a vendor of cold products.

More particularly, the method comprises:

a phase for checking, through a control unit 2, a plurality of functioning parameters of the food refrigerator 1;

a phase for reading, through an RFID reader 3, data stored inside a plurality of RFID tag attached to the cold products;

a phase for interconnecting, through a communication unit 4, an external device, informing it on a geographical localization of the food refrigerator 1.

According to the method of the invention, the phase of reading is executed when the cold products are still stocked inside the food refrigerator.

Data are grouped in an inventory data file for example comprising a number of cold products sold, their permanence inside the food refrigerator 1 and their production date.

The inventory data file is transmitted at predetermined time intervals from the communication unit 4 to said remote control unit 5; also the functioning parameters are sent from the communication unit 4 to the remote control unit 5.

More particularly, the functioning parameters includes a geographic location information, derived by an analysis of a connection between the communication unit 4 and a GPRS/GSM transmission cell accepting the connection.

The remote control unit 5 stores a log, comprising said functioning parameters of the food refrigerator 1, relative to corresponding functioning periods.

A transmission of said inventory data or functioning parameters to said remote control unit 5 may be triggered by a fault (for example, interior temperature out of the range, compressor malfunction, delocalization, connection error, unplugging—power off), detected by the control unit 2, or scheduled at predefined time intervals, or simply on demand sending a call to the phone number of the communication unit 4.

The system and the method according to the present invention achieve a plurality of benefits in the maintenance and use of food refrigerators 1, hereinafter briefly resumed:

checking, through a remote server 5, each single refrigerator 1 given in rental or in free loan from a manufacturer of cold product to a vendor of such cold product; thus giving the possibility of a real time asset inventory so as to prevent misposting in the balance sheet;

according to the information about the working hours of the single refrigerator, a fine tuning in the depreciation policy could be done by the refrigerator owner;

remote modification of function parameters associated to each single refrigerators 1, for example a temperature value setting. The remote modification allows a setting of the control unit 2 located inside the refrigerator 1, through a remote communication;

preventive maintenance of a refrigerator 1 on the base of statistic data retrieved by similar refrigerators 1, for example indicating the life time of single components or the so called MTBF (Mean Time Between Failures);

"ad hoc" maintenance triggered by the control unit 2 to the remote server 5 on the base of a detection of an abnormal function parameter;

geographic localization/delocalization-check of refrigerator 1;

remote inventory of refrigerator 1 giving the possibility to obtain periodic reports of incoming and out-coming flows of products to the refrigerator and its instant by instant content.

The invention claimed is:

1. A system for remotely controlling and monitoring a food refrigerator of the type intended to be given in rental or in free loan from a manufacturer to a vendor of cold products, comprising:

a control unit for checking and storing a plurality of functioning parameters of said food refrigerator, a Radio Frequency Identification (RFID) reader for reading data stored in a plurality of RFID tags attached to said cold products, a communication unit for interconnecting an external device for obtaining information on a geographical localization of said food refrigerator, said RFID reader comprising means for retrieving said data from said RFID tags when said cold products are still stocked inside said food refrigerator and said communication unit comprising localization means for transmitting information to said external device on a geographical localization of said food refrigerator, and means for transmitting a delocalization message from the communication unit to the remote server when a number of Global System for Mobile Communications (GSM)/General Packet Radio Service (GPRS) transmission cells connected by the communication unit before a power off and overlapping to GSM/GPRS transmission cells connected by the communication unit after a successive power on is not greater than a predetermined threshold.

2. The system according to claim 1 wherein said means emit a radio frequency signal at predetermined time intervals for activating said RFID tags.

3. The system according to claim 1 wherein said communication unit is a GSM/GPRS unit or similar cell-based communication system.

4. The system according to claim 1 wherein said external devices is a second food refrigerator.

5. The system according to claim 4 wherein said food refrigerator and said second food refrigerator resides in a same local area network (LAN) interconnecting respective communication units.

6. The system according to claim 1 wherein said external device is a remote server located outside said local area network (LAN).

7. The system according to claim 1 characterized by comprising a plurality of box-cases for hosting said cold products.

8. The system according to claim 7 wherein said box cases are mono-use boxes or plastic wrap.

9. The system according to claim 1 wherein said localization means retrieve localization data from a connection between said communication unit and a set of transmission cells of a GSM/GPRS network.

10. A method for remote control of a food refrigerator of the type intended to be given in rental or in free loan from a manufacturer to a vendor of cold products, comprising the following phases:

checking, through a control unit, a plurality of functioning parameters of said food refrigerator;

reading, through a Radio Frequency Identification (RFID) reader, data stored inside a plurality of RFID tags attached to said cold products, said phase of reading being executed when said cold products are still stocked inside said food refrigerator;

interconnecting, through a communication unit, an external device, obtaining information on a geographical localization of said food refrigerator; and transmitting a delocalization message from the communication unit to the remote server when a number of Global System for Mobile Communications (GSM)/General Packet Radio Service (GPRS) transmission cells connected by the communication unit before a power off and overlapping to GSM/GPRS transmission cells connected by the communication unit after a successive power on is not greater than a predetermined threshold.

11. The method according to claim 10, wherein said data are grouped in an inventory data file comprising a number of cold products sold and/or their permanence inside the food refrigerator and/or their production date and or their sale date.

12. The method according to claim 11, wherein said inventory data file is transmitted at predetermined time intervals from said communication unit to said remote server.

13. The method according to claim 10, wherein said functioning parameters are sent at predetermined time intervals from said communication unit to said remote server.

14. The method according to claim 10, wherein said geographical localization is derived by an analysis of a connection between said communication unit and real-time detectable Global System for Mobile Communications (GSM)/General Packet Radio Service (GPRS) transmission cells.

15. The method according to claim 13, wherein said remote server stores a log, comprising said functioning parameters of said food refrigerator, relative to corresponding functioning periods.

16. The method according to claim 10, wherein a transmission of said inventory data or functioning parameters to said remote server is triggered by a fault detected by said control unit.

17. The method according to claim 14, wherein the delocalization message is transmitted, from said communication unit to said remote server, when a change of transmission cells of a GSM/GPRS network is detected by said communication unit after a power fault.

18. The method according to claim 10, wherein a transmission of said inventory data or functioning parameters to said remote server is triggered by sending a phone call to said control unit.

* * * * *